United States Patent [19]

Naba et al.

[11] Patent Number: 5,602,983
[45] Date of Patent: Feb. 11, 1997

[54] IMAGE DISPLAY SYSTEM USING A COMMON VIDEO MEMORY FOR PHASED TERMINALS

[75] Inventors: Takashi Naba, Kawasaki; Keishi Inoue, Yokohama, both of Japan

[73] Assignee: Canon Kabushiki Kaisha, Shimomaruko, Japan

[21] Appl. No.: 49,667

[22] Filed: Apr. 21, 1993

Related U.S. Application Data

[63] Continuation of Ser. No. 488,734, Feb. 26, 1990, abandoned.

[30] Foreign Application Priority Data

Feb. 28, 1989 [JP] Japan ................................. 1-45276
Mar. 7, 1989 [JP] Japan ................................. 1-54559

[51] Int. Cl.$^6$ ..................................................... G06T 1/00
[52] U.S. Cl. ........................... 395/501; 395/521; 395/507; 345/1
[58] Field of Search ..................... 395/153, 133, 395/141, 154, 162, 164; 340/747; 345/1–5, 6

[56] References Cited

U.S. PATENT DOCUMENTS 4,704,697 11/1987 Kiremidjian et al. ............. 340/747 X
4,760,388 7/1988 Tatsumi et al. ............................. 345/1
4,924,410 5/1990 Hamada .................................. 395/153

*Primary Examiner*—Almis R. Jankus
*Attorney, Agent, or Firm*—Fitzpatrick, Cella, Harper & Scinto

[57] ABSTRACT

An image display system for display image information obtained by accessing an image data base or the like which was stored in an electronic filing device. The system has: an electronic filing device to store a plurality of pieces of information; a plurality of terminal devices; a common image information memory such as a video RAM to store the image information read out of the electronic filing device on the basis of an instruction from at least one of the terminal devices; and a distributor to distribute and transfer the image information stored in the VRAM to any or all of the terminal devices in accordance with an image transfer instruction from such terminal device(s). A ferroelectric liquid crystal or other display panel which can hold the image information for a predetermined time may be used as a display. The display information can be individually effectively accessed from the electronic filing device by each terminal device while commonly using a single VRAM.

17 Claims, 8 Drawing Sheets

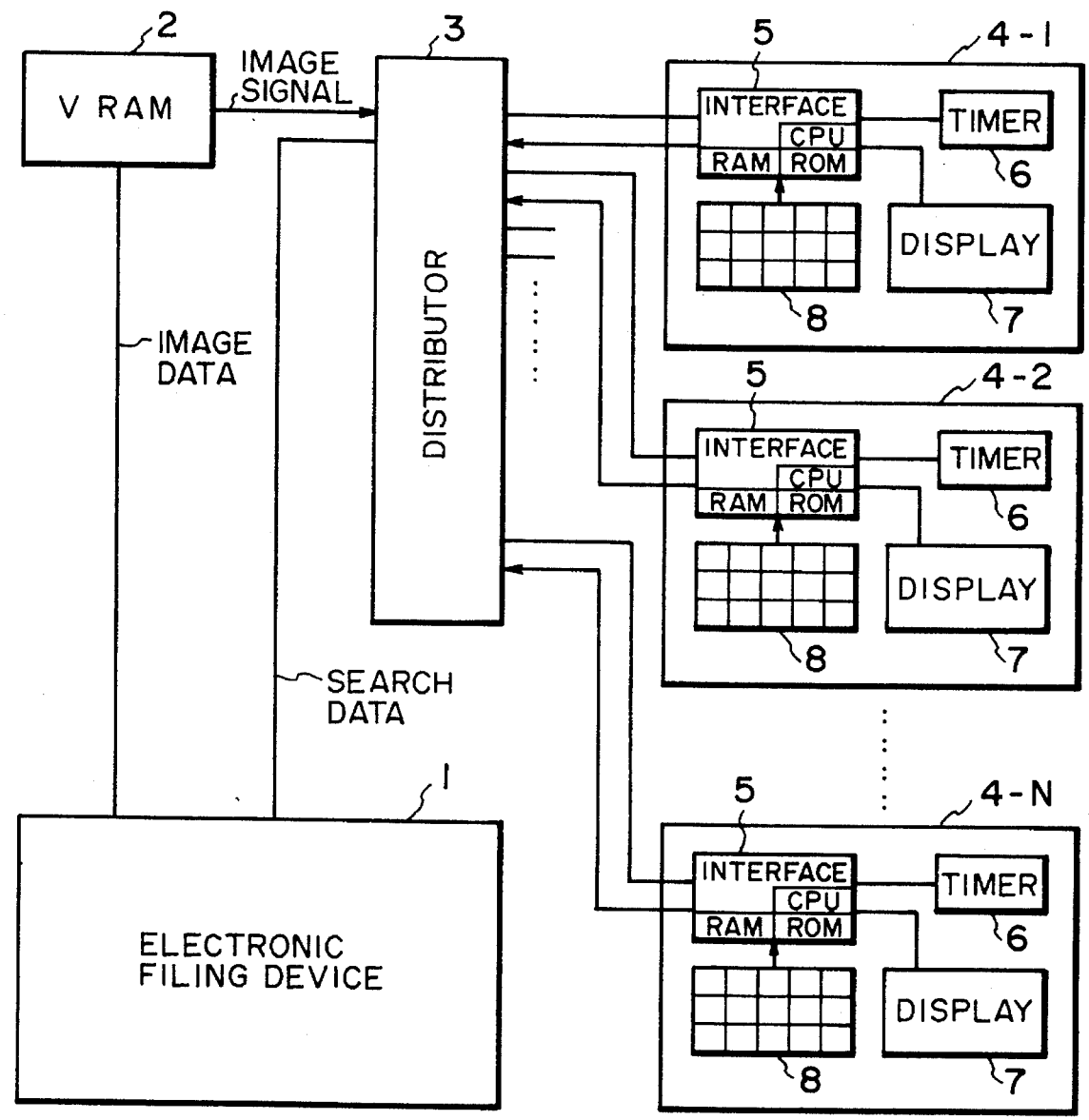
F I G. 1

IMAGE DISPLAY SYSTEM USING A COMMON VIDEO MEMORY FOR PHASED TERMINALS

This application is a continuation of application Ser. No. 07/488,734, filed Feb. 26, 1990 now abandoned.

BACKGROUND OF THE INVENTION

1. Field of the Invention

The present invention relates to an image display system for displaying image information which is obtained by accessing an image data base or the like stored in an electronic filing device.

2. Related Background Art

In recent years, a number of apparatuses for handling image data of an electronic filing device and the like have been developed. An image display system shown in FIG. 4 for displaying the image information obtained from such a kind of apparatus has also been proposed.

FIG. 4 is a system block diagram for explaining the fundamental construction of a conventional image display system. Reference numeral 51 denotes an electronic filing device for managing images, documents, and the like of a large capacity which have been stored in a memory medium such as an optical disk or the like. Reference numeral 52 indicates a video RAM (VRAM) for storing image data read out of the electronic filing device 51. Reference numeral 53 represents a display which is constructed by, for example, a CRT for displaying images, documents, and the like on the basis of an image signal developed in the VRAM 52.

For use as the display 53, attention has been paid to a liquid crystal display different from a CRT display. Particularly, in association with the realization of a large screen, a display having a memory function of the active matrix type, ferroelectric type, or the like has been developed.

On the other hand, the electronic filing device has been being used for various kinds of processings such as identification and the like. Demand for executing various work by electronic processes by connecting a number of display terminals is becoming larger and larger.

However, the system for displaying image information through the VRAM 52 as mentioned above is constructed, for instance, as shown in FIG. 5.

FIG. 5 is a system block diagram for explaining a construction of a conventional image display system, in which the same parts and components as those in FIG. 4 are designated by the same reference numerals.

In the diagram, reference numerals 61-1 to 61-N denote terminal devices each comprising an interface IF, the VRAM 52, a keyboard KB, the display 53, and the like.

Therefore, the VRAM 52 needs to be individually provided for the terminal devices 61-1 to 61-N, so that there is a problem in that the system is very expensive.

On the other hand, even in the liquid crystal display having the memory function of the active matrix type, ferroelectric type, or the like, its memory function is insufficient. Consequently, there is also a problem in that the VRAM 25 is needed and the system is very expensive.

In addition to the above liquid crystal display, in the case where a page printer such as a laser beam printer (LBP) or the like is connected and image information is printed by the page printer, since the image data is transmitted to the page printer at a high speed, a page memory which is used only for the LBP is provided.

That is, as shown in FIG. 8, in a conventional image display system, an electronic filing device 81 or the like supplies image information to a VRAM 82 and a page memory 83, a display 84 receives an image signal from the VRAM 82, and an LBP 85 receives the image signal from the page memory 83. Namely, in the case of using the display 84 and LBP 85, two memories, the VRAM 82 and page memory 83, are needed.

Since the memory construction of the VRAM 82 only for use of the liquid crystal display, and that of the page memory 83, only for use in the LBP are almost the same, there is a demand for being able to use first one video RAM by commonly constructing the memories 82 and 83.

However, in such case, when a signal of the video RAM is being output to the LBP 85, it cannot be displayed by the liquid crystal display 84; and on the other hand, when a signal of the video RAM is being output to the liquid crystal display 84, it cannot be output by the LBP 85.

SUMMARY OF THE INVENTION

It is an object of the present invention to provide an image display system in which a video RAM for display is commonly used and display information can be individually extracted by each of a plurality of terminal devices.

Another object of the invention is to provide an image display system in which there is no need to individually provide a video RAM for display to each of a plurality of terminal devices connected to an electronic filing device, such that each of the terminal device can be simplified.

Still another object of the invention is to provide an image display system in which each of a plurality of terminal devices connected to an electronic filing device can effectively access the electronic filing device and system use efficiency can be greatly improved.

Further another object of the invention is to provide an image display system in which an image can be output by an LBP while displaying it by a liquid crystal display, using a single video RAM.

BRIEF DESCRIPTION OF THE DRAWINGS

FIG. 1 is a block diagram for explaining the construction of an image display system showing an embodiment of the present invention;

DETAILED DESCRIPTION OF THE EMBODIMENTS

Figure 2:
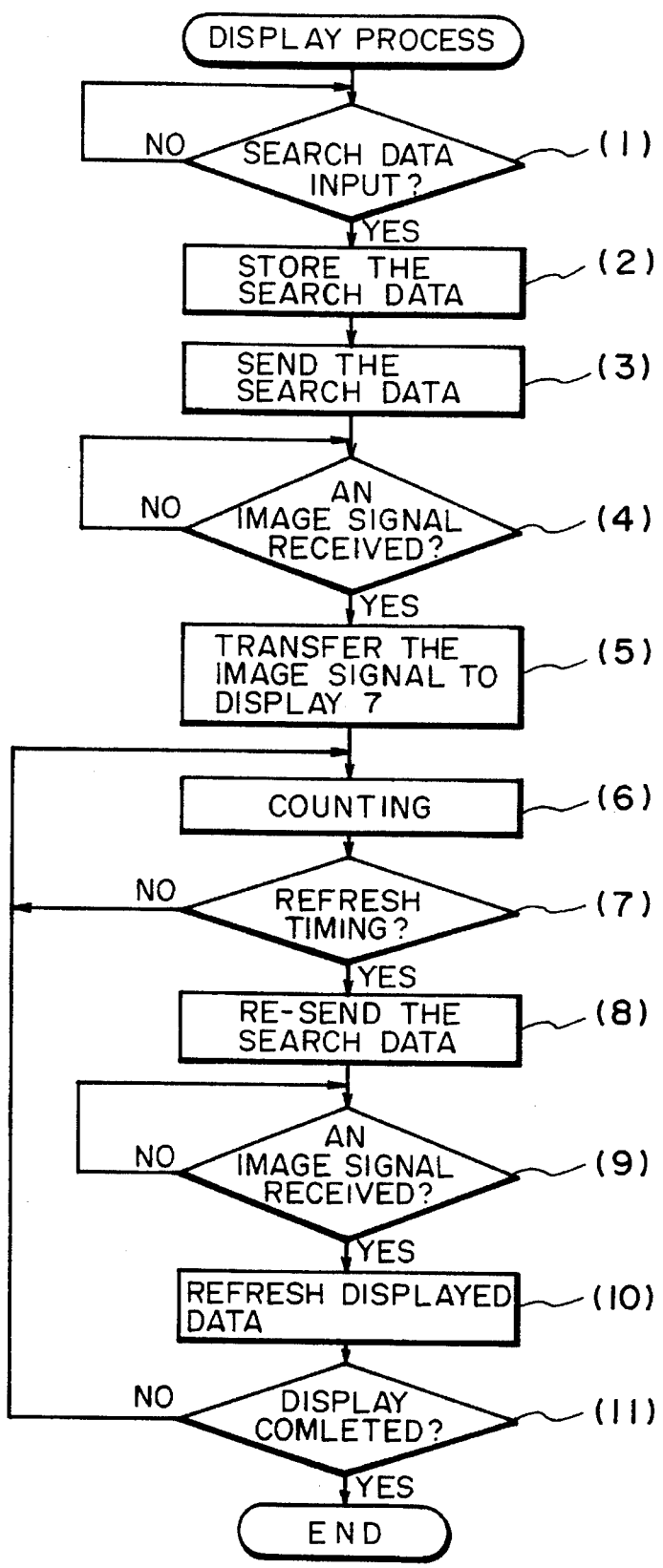
FIG. 2 is a flowchart showing an example of a display processing procedure of a terminal device shown in FIG. 1.

FIG. 1 is a block diagram for explaining a construction of an image display system showing an embodiment of the present invention, in which the same circuit components are designated by the same reference numerals.

In the diagram, reference numeral 1 denotes an electronic filing device main body (electronic filing device) having a memory device such as a memory medium of a large capacity, for instance, an optical disk or the like. Image data based on search data is searched and developed into a video RAM (VRAM) 2 as common display information memory means of the invention.

Reference numeral 3 denotes a distributor serving as distributing means of the invention. The distributor 3 is connected to terminal devices 4-1 to 4-N through communication cables. The distributor 3 extracts the image data developed in the VRAM 2 as an image signal and transfers the data to any of the terminal devices 4-1 to 4-N where access has been requested.

Each of the terminal devices 4-1 to 4-N comprises: an interface 5, a timer 6, a display 7, a keyboard 8, and the like. Particularly, the display 7 is constructed by a ferroelectric liquid crystal display panel and can hold display information for a predetermined period of time. In response to the start of the display, the timer 6 starts the refresh timing counting process. When the refresh timing comes, the timer 6 interrupts the interface 5 and sends search data to the electronic filing device 1 through the distributor 3 to request retransfer of the same image as the display information which is at present displayed on the display 7. In response to the search data, the image data, again searched by the electronic filing device 1 and developed into the VRAM 2, is extracted as an image signal. The distributor 3 transfers the extracted image data to the interface 5 of each of the terminal devices 4-1 to 4-N where access has been requested. The display information displayed on the display 7 is refreshed, and the same picture plane is continuously displayed. The interface 5 has a microprocessor (CPU), a ROM, a RAM, etc. and outputs an image display instruction and a search instruction to the distributor 3 on the basis of control programs stored in the ROM, which will be explained hereinbelow.

The operation of each section will now be described.

When search data is instructed and input from the keyboard 8 of an arbitrary terminal device, for instance, the terminal device 4-1, the search data is transmitted to the electronic filing device 1 through the interface 5, communication cable, distributor 3, and the like. At this time, in this embodiment, the search data is stored in the RAM of the interface 5.

In response, the electronic filing device 1 searches the image data corresponding to the search data from the memory medium and develops that image data into the video RAM 2. Then, the image data stored in the VRAM 2 is extracted as an image signal and is transmitted to the interface 5 of the access-requested terminal device 4-1 by the distributor 3. The interface 5 displays the received image signal using to the display 7. As mentioned above, since the display 7 can store the displayed content for a predetermined time, when the reception of the image signal is completed, the interface 5 informs a completion of the reception to the distributor 3. Thus, the electronic filing device 1 starts the process corresponding to an access request from another terminal.

On the other hand, when the display to the display 7 is started, the refresh timing counting process by the timer 6 is started. When the refresh timing comes, the interface 5 is interrupted, the refreshing process based on the search data which was backed up in the RAM is started, and reading of the same image data as the content on the screen displayed by the display 7 is instructed to the electronic filing device 1 through the distributor 3. In response to the reading instruction, the image data, searched and developed in the VRAM 2 in a manner similar to the above, is extracted as an image signal and transmitted to the interface 5 of the access requested terminal device 4-1 by the distributor 3. The interface 5 allows the image data to be again displayed by the display 7, thereby completing the refreshing process of the image information of the same screen. The above processes are repeated each time refresh is necessary and thus the display on the screen is continued.

FIG. 2 is a flowchart showing an example of a display processing procedure of the terminal devices 4-1 to 4-N shown in FIG. 1. Reference numerals (1) to (11) indicate processing steps.

The interface 5 waits until the search data to display an image is input from the keyboard 8 (1). When the search data is input, it is stored in the RAM (2). The search data is sent to the electronic filing device 1 through the distributor 3 (3).

Next, a check is made to see if the image signal which was searched from the electronic filing device 1 and stored into the VRAM 2 has been received or not (4). After the image signal is received, it is sent to the display 7 (5). The refresh timing counting process is started (6). The image signal is held as display data and displayed on the screen.

Next, a check is made to see if the refresh timing has come or not (7). If NO, the processing routine is returned to step (6). If YES, the search data stored in the RAM is again transmitted to the electronic filing device 1 through the distributor 3 (8).

A check is then made to see if the same signal as the displayed image signal has been received or not (9). Upon completion of the signal reception, the image signal is again transmitted to the display 7 and the display data is refreshed (10).

A check is then made to see if the display has been finished or not (11). If YES, the process is finished. If NO, the processing routine is returned to step (6) and the display process is continued.

The above embodiment has been described with respect to the case where the timer 6 is provided for each of the terminal devices 4-1 to 4-N and the refresh timing of the displayed data is managed on the terminal side. However, as shown in FIG. 3, it is also possible to provide the timer 6 on the side of the distributor 3 and to manage the refresh timing.

Figure 3:
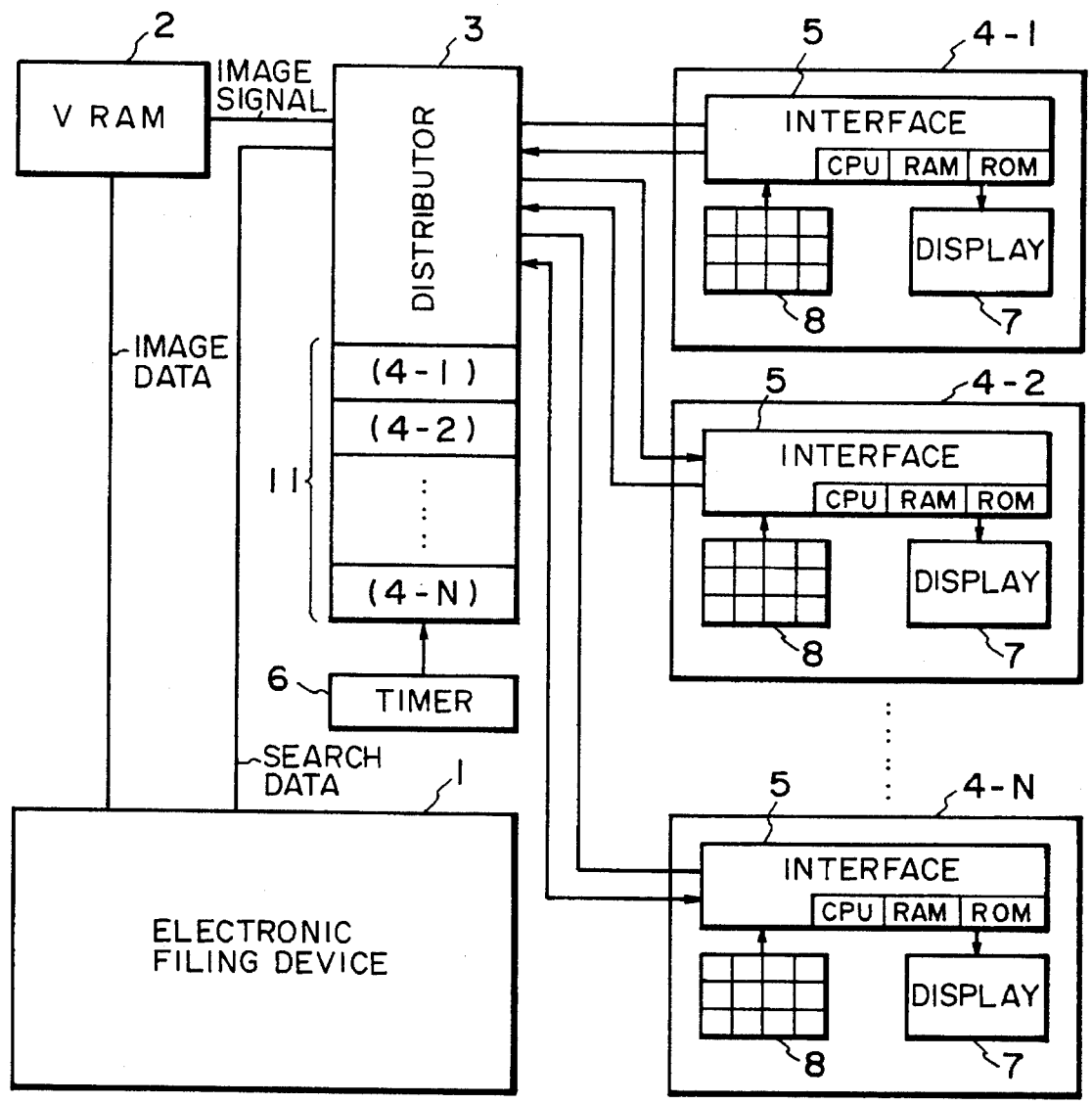
FIG. 3 is a system block diagram for explaining the construction of an image display system showing another embodiment of the invention.
Figure 4:
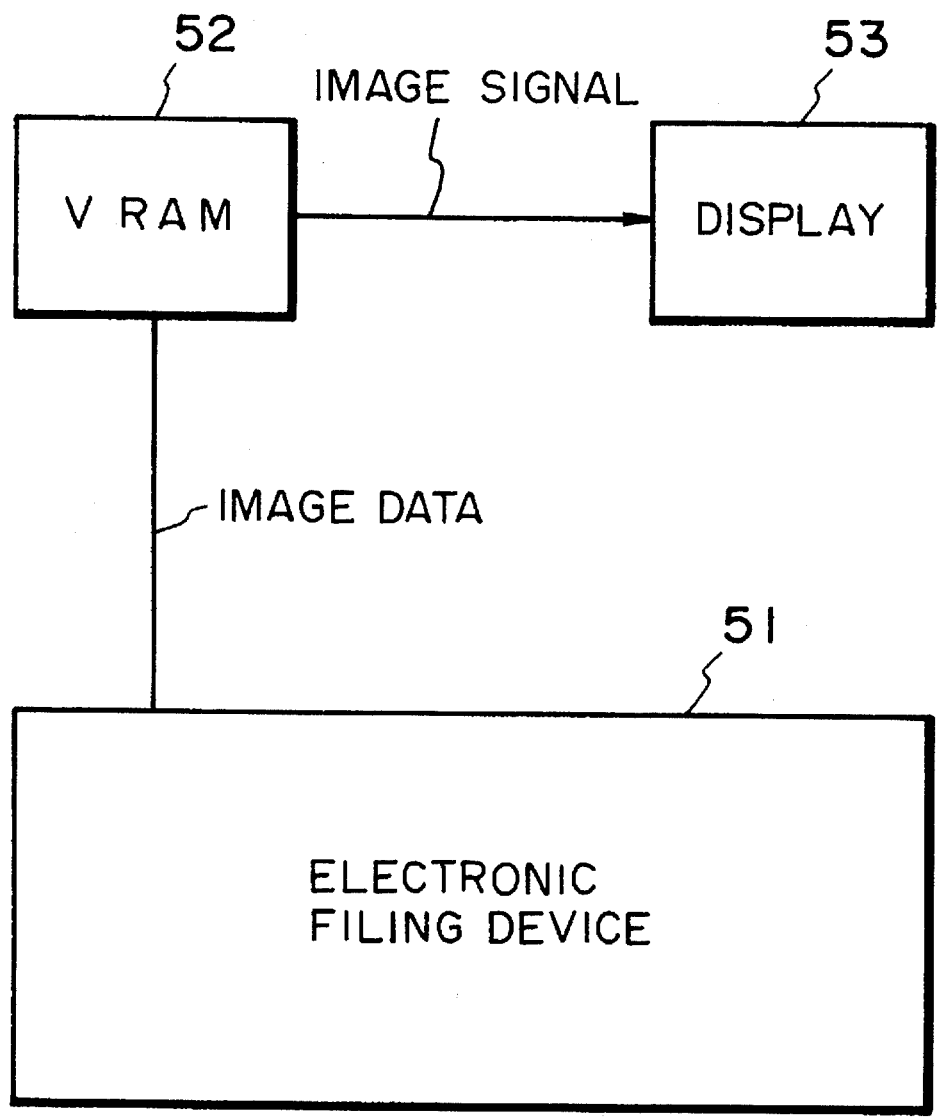
FIG. 4 is a system block diagram for explaining the fundamental construction of a conventional image display system.
Figure 5:
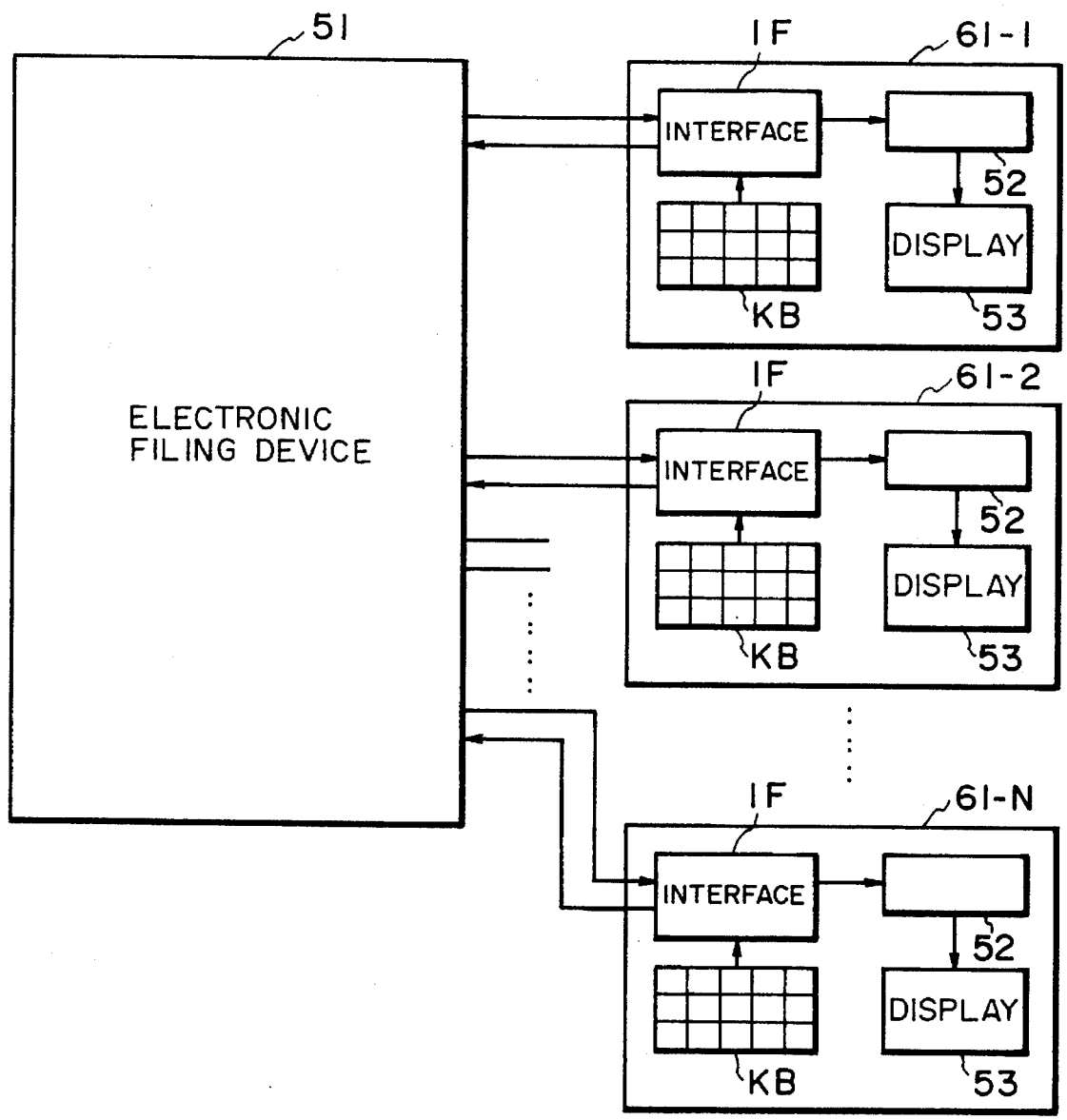
FIG. 5 is a system block diagram for explaining the construction of the conventional image display system.

FIG. 3 is a system block diagram for explaining a construction of an image display system showing another embodiment of the invention, in which the same parts and components as those in FIG. 1 are designated by the same reference numerals.

In the diagram, reference numeral 11 indicates a management data area for temporarily storing the search data transmitted from each of the terminal devices 4-1 to 4-N, for again transmitting the search data transmitted from each of the terminal devices 4-1 to 4-N on accordance with a counting processing state of the timer 6 to the electronic filing device 1, and for again outputting the image data stored in the VRAM 2 as an image signal to the interface 5 of each of the terminal devices 4-1 to 4-N.

Due to this, the construction of each of the terminal devices 4-1 to 4-N can be further simplified, and the apparatus can be miniaturized.

Although the present embodiment has been described with respect to the case where the invention is applied in a system network through communication cables, the invention can be also applied to an image display system using communication lines.

As described above, according to the invention, the display information memory means can be omitted from each of the terminal devices, the construction of each terminal device can be simplified, and the apparatus can be miniaturized. On the other hand, before the picture quality of the display screen of the display means deteriorates, the same image is refreshed as necessary. Therefore, another terminal device can effectively access the electronic file, and there is an excellent advantage that the image display system use efficiency can be fairly improved or the like.

Figure 6:
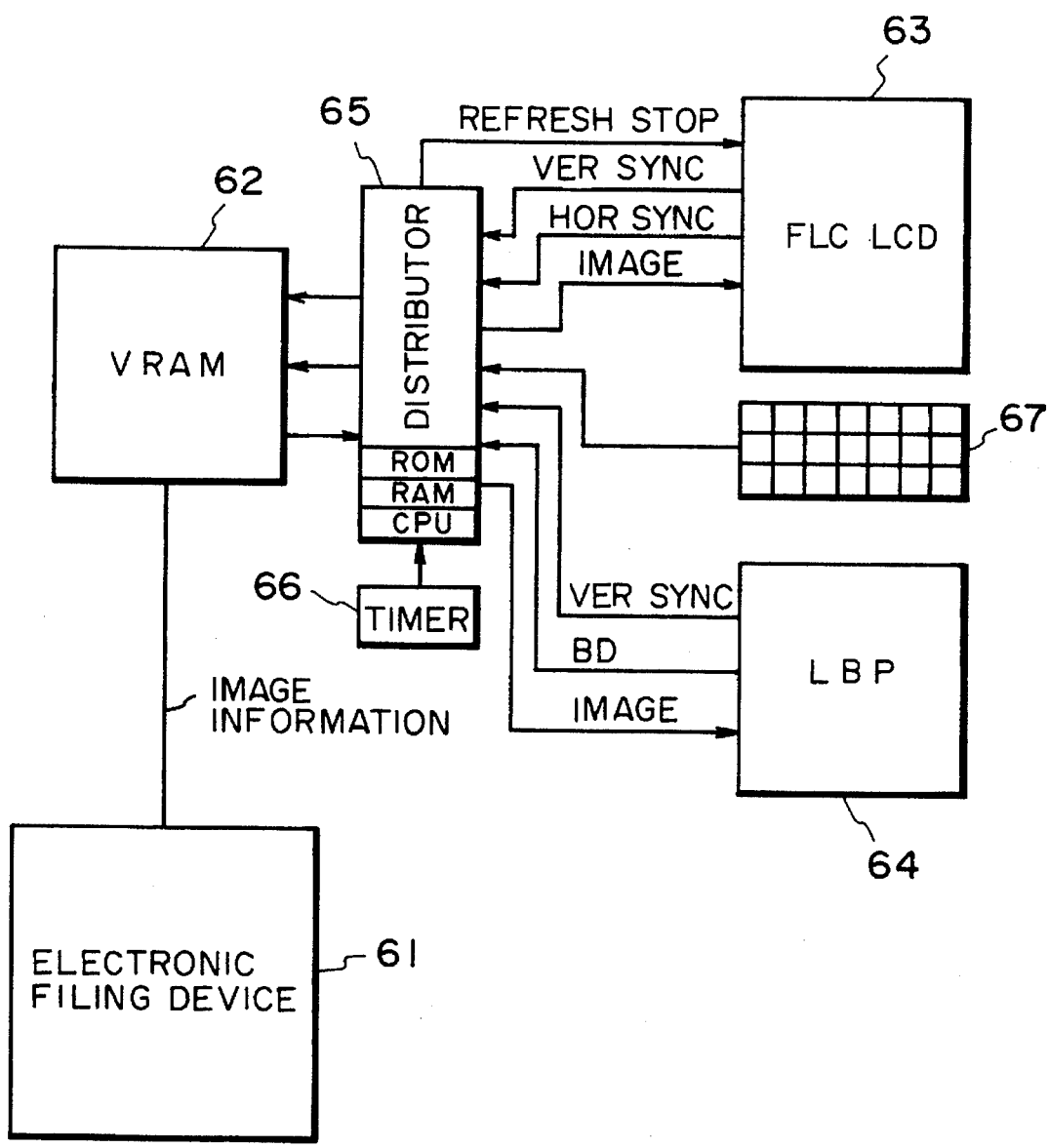
FIG. 6 is a block diagram showing still another embodiment of the invention.

FIG. 6 is a block diagram showing still another embodiment of the invention.

In this embodiment, the electronic filing device 61 is provided with: one video RAM (VRAM) 62; FLC type liquid crystal display 63; an LBP (laser beam printer) 64; and a distributor 65. The distributor 65 has a CPU, a RAM, and a ROM to store operation programs, which will be explained hereinbelow.

The VRAM 62 is shown as an example of a video RAM to store image information of at least one page. The image signal is sent to the FLC type display 63 and LBP 64. The VRAM 62 receives a vertical sync signal, a horizontal sync signal, and a BD signal from the display 63 and LBP 64.

The LBP 64 is shown as an example of a page printer.

The distributor 65 distributes the image signal from the VRAM 62 to the liquid crystal display 63 and LBP 64 and supplies an image refresh signal to refresh the image to be displayed by the display 63. When image data is output by the LBP 64, the distributor 65 supplies an image refresh stop signal, to stop the image refreshing operation, to the display 63.

That is, the distributor 65 refreshes the image of the liquid crystal display having a memory function. Ordinarily, the distributor 65 is shown as an example of switching means for supplying the signal of the VRAM to the liquid crystal display and for supplying the signal of the VRAM to the page printer only when the image is output by the page printer. Further, the distributor 65 stops the image refreshing process when the image is output by the page printer. Reference numeral 66 denotes a timer to manage the refresh timing for the liquid crystal display, and 67 indicates a keyboard to input data such as a print instruction and the like.

The operation of the above embodiment will now be described with reference to FIG. 7, a flowchart showing the operation of the embodiment.

First, the electronic filing device 61 sends image information (S1). The image information is stored in the VRAM 62 (S2).

The image signal stored in the VRAM 62 is transferred to the FLC type liquid crystal display 63 and displayed by the display 63 (S3). The refresh timing is counted by the timer 66 provided in the distributor 65 (S4). If no print output instruction is input during the counting process of the timer 66 (S5) and when the refresh timing comes (S6), the image on the display 63 is refreshed (S7). That is, the refresh timing is detected by the timer 66 provided in the distributor 65 before the image deteriorates. The liquid crystal display 63 is refreshed.

On the other hand, if a print output instruction to output the image by the LBP 64 is input (S5), the image refreshing process for the display 63 is stopped (S11). Namely, the operation of the timer to detect the refresh timing which is provided in the distributor 65 is stopped and the destination of the image signal is changed from the display 63 to the LBP 64 (S12). The image is printed by the LBP 64 (S13).

If the display operation by the display 63 or the print operation by the LBP 64 is continued (S8), the operations in steps S4 to S7 or steps S11 to S13 are repeated.

As mentioned above, when the image is not output by the LBP 64, it is displayed by the liquid crystal display 63. In this case, the image signal from the VRAM 62 is supplied to the display 63, and the display 63 is image refreshed at a predetermined timing. When the image is output by the LBP 64, the image signal from the VRAM 62 is supplied to the LBP 64 through the distributor 65. The image refresh for the display 63 is stopped. The image display by the display 63 is continued during the time interval when the image refresh is stopped. Therefore, the image is also displayed by the display 63 for the period of time when the image is being printed by the LBP 64.

That is, in this embodiment, by merely providing the single VRAM 62, the image can be output by the LBP 64 while displaying by the display 63.

In place of the FLC type display 63, another display having the memory function such as an active matrix type liquid crystal display or the like can be also used. In place of the LBP 64, another page printer can be also used.

What is claimed is:

1. A display control system comprising:

memory means for storing a plurality of pieces of information;

a plurality of display means each of which displays a different piece of the plurality of pieces of information at a given time;

bit pattern information memory means for storing in the same storage area, a different one of the plurality of pieces of information at a time, as successively read out of said memory means as bit pattern information; and control means for controlling said bit pattern information memory means to transfer the bit pattern information stored in said bit pattern information memory means to any selected one of said plurality of display means, wherein said memory means has a capacity equal to or larger than a display capacity of one of said plurality of display means and smaller than the total display capacity of the plurality of display means.

2. A system according to claim 1, wherein each of said plurality of display means comprises a ferroelectric liquid crystal display panel which can hold the transferred bit pattern information for a predetermined time.

3. A system according to claim 1, further comprising timer means for measuring a timing to transfer the information displayed in one of said plurality of display means, wherein said control means controls said bit pattern information memory means to transfer the bit pattern information to said one display means in response to the measured timing.

4. A system according to claim 1, further comprising a plurality of terminal means each having input means wherein each of said plurality of terminal means includes one such display means and one such timer means.

5. A system according to claim 4, wherein said memory means and said plurality of terminal means are interconnected by means of a communication cable.

6. A display control system comprising:

memory means for storing a plurality of pieces of information;

a plurality of display means each of which displays a different piece of the plurality of pieces of information at a given time;

printing means for printing information;

bit pattern information memory means for storing in a same storage area, a different one of the plurality of pieces of information at a time, as successively read out of said memory means as bit pattern information; and control means for controlling said bit pattern information memory means to transfer the bit pattern information stored in said bit pattern information memory means to any selected one of said display means and said printing means, wherein said memory means has a capacity equal to or larger than a display capacity of one of said plurality of display means and smaller than the total display capacity of the plurality of display means.

7. A system according to claim 6, wherein each of said plurality of display means comprises a ferroelectric liquid crystal display panel.

8. A system according to claim 6, further comprising timer means for measuring a timing to transfer the information displayed in said plurality of display means, wherein said control means controls said bit pattern information memory means to transfer the bit pattern information to said plurality of display means in response to the measured timing.

9. A system according to claim 8, further comprising a plurality of terminal means having input means wherein said plurality of terminal means includes said plurality of display means and said timer means.

10. A system according to claim 9, wherein said memory means and said plurality of terminal means are interconnected by means of a communication cable.

11. A system according to claim 6, further comprising means for generating an instruction for printing, wherein said control means control said bit pattern information memory means to transfer the bit pattern information stored therein to said printing means in response to the print instruction.

12. A display control method comprising the steps of:

instructing reading of a different one of a plurality of pieces of information at a time from a memory;

reading each different one of the plurality of pieces of information in succession from the memory in response to an instruction given in said instructing step;

storing each successively read different one of the plurality of pieces of information read in said reading step in a same storage area in a bit pattern memory as bit pattern information;

successively transferring the bit pattern information stored in the bit pattern memory in said storing step to any selected one of a plurality of display devices; and displaying the bit pattern information transferred in said transferring step in the one display device, wherein said memory has a capacity equal to or larger than a display capacity of one of said plurality of display devices and smaller than the total display capacity of the plurality of display means.

13. A method according to claim 12, further comprising the step of measuring a time from the transfer of the bit pattern information wherein the transfer of the bit pattern information is instructed when the measured time has reached a predetermined value.

14. A display control system comprising:

memory means for storing a plurality of pieces of information;

bit pattern information memory means for storing in the same storage area, a different one of the plurality of pieces of information at a time, as successively read out of said memory means as bit pattern information; and control means for controlling said bit pattern information memory means to transfer the bit pattern information stored in said bit pattern information memory means to any selected one of a plurality of display means each of which displays a different piece of the plurality of pieces of information at a given time, wherein said memory means has a capacity equal to or larger than a display capacity of one of said plurality of display means and smaller than the total display capacity of the plurality of display means.

15. A system according to claim 14, wherein the display means is a ferroelectric liquid crystal display panel which can hold the image information for a predetermined time.

16. A system according to claim 14, further comprising timer means for measuring a timing to transfer the information displayed in one of said plurality of display means, wherein said control means controls said bit pattern information memory means to transfer the bit pattern information to said one display means in response to the measured timing.

17. A system according to claim 14, further comprising a plurality of terminal means each having input means wherein each of said plurality of terminal means includes one such display means and one such timer means.

* * * * *

UNITED STATES PATENT AND TRADEMARK OFFICE
CERTIFICATE OF CORRECTION

PATENT NO. : 5,602,983

DATED : February 11, 1997

INVENTORS : NABA TAKASHI ET AL.

Page 1 of 2

It is certified that error appears in the above-identified patent and that said Letters Patent is hereby corrected as shown below:

ON TITLE PAGE

[73] Assignee: "Shimomaruko," should read --Tokyo,--.

IN THE DRAWINGS

Figure 7:
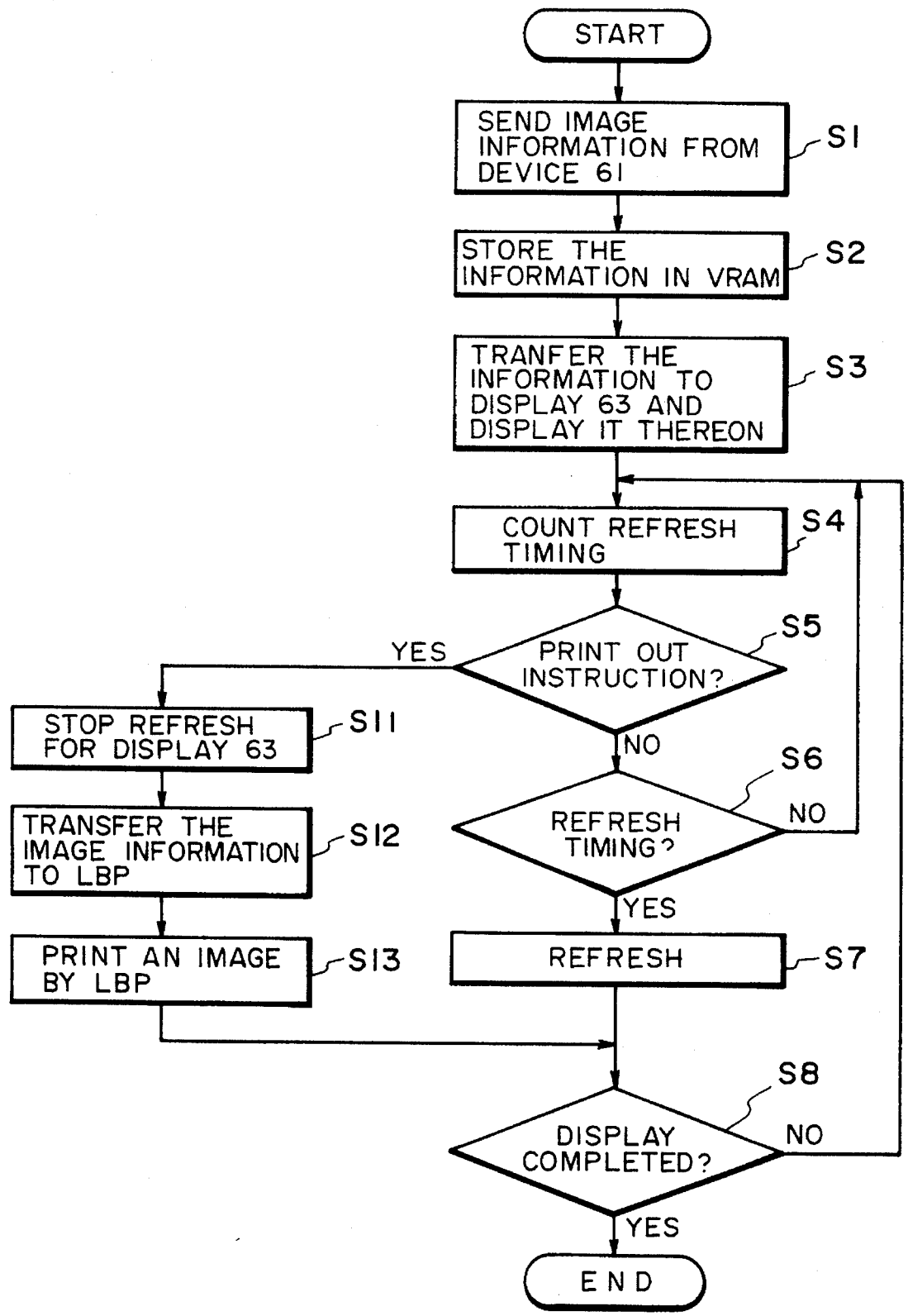
FIG. 7 is a flowchart showing a processing procedure of the embodiment shown in FIG. 6.
Figure 8:
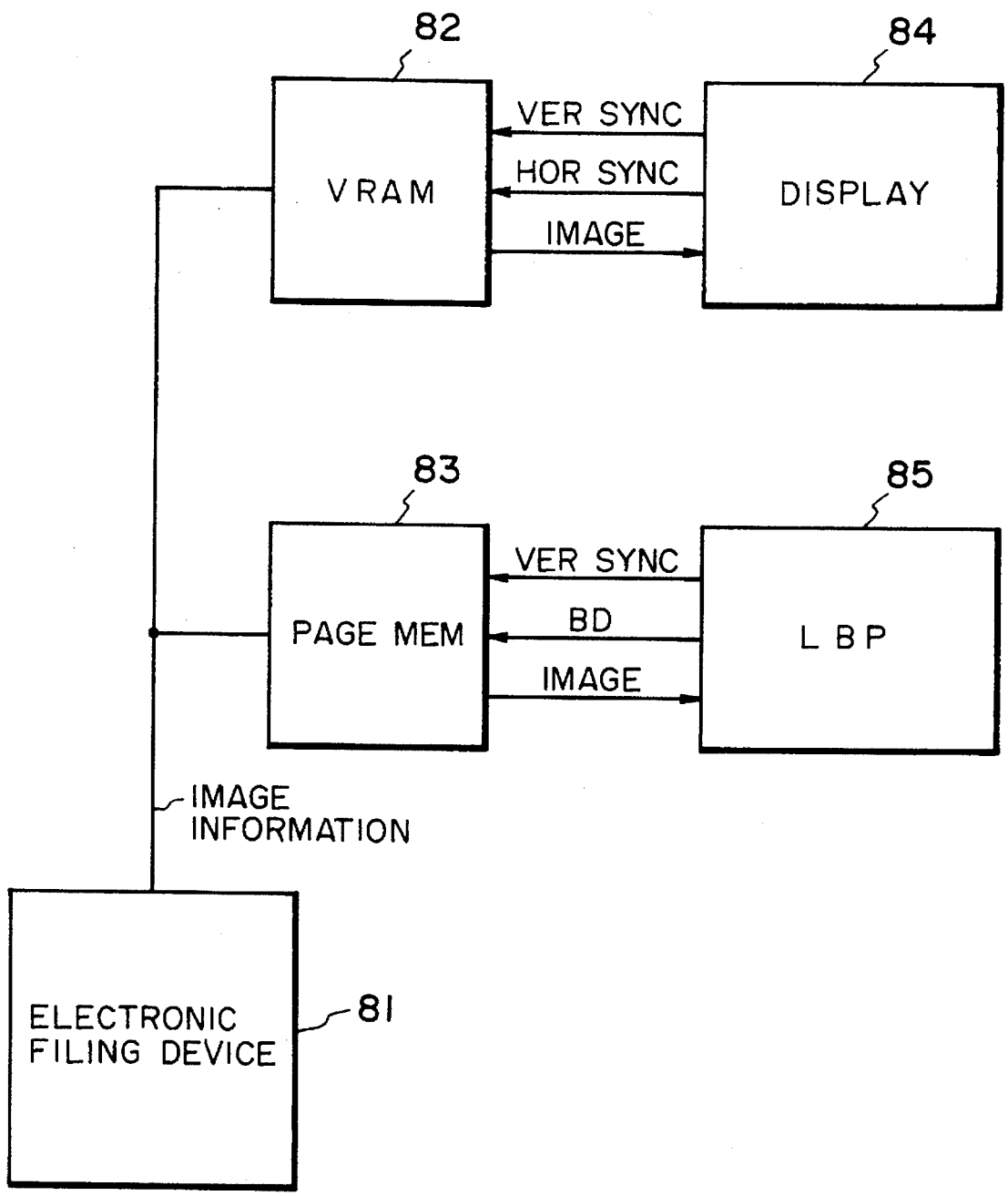
FIG. 8 is a diagram showing a conventional construction.

Sheet 7 of 8  FIG. 7. "TRANFER" should read --TRANSFER--.

COLUMN 2

Line 8,  "VRAM 82" should read --VRAM 82,--;
Line 29, "device" should read --devices--.

COLUMN 3

Line 52, "to" should be deleted.

UNITED STATES PATENT AND TRADEMARK OFFICE
CERTIFICATE OF CORRECTION

PATENT NO. : 5,602,983

DATED : February 11, 1997

INVENTORS : NABA TAKASHI ET AL.

Page 2 of 2

It is certified that error appears in the above-identified patent and that said Letters Patent is hereby corrected as shown below:

<u>COLUMN 4</u>

"on" should read --in--.

Signed and Sealed this

Nineteenth Day of August, 1997

*Attest:*

BRUCE LEHMAN

*Attesting Officer*

*Commissioner of Patents and Trademarks*